(12) United States Patent
Gupta et al.

(10) Patent No.: US 11,449,893 B1
(45) Date of Patent: Sep. 20, 2022

(54) METHOD FOR IDENTIFYING WHEN A NEWLY ENCOUNTERED ADVERTISEMENT IS A VARIANT OF A KNOWN ADVERTISEMENT

(71) Applicant: Alphonso Inc., Mountain View, CA (US)

(72) Inventors: Manish Gupta, Bangalore (IN); Tapan Sharma, Rajasthan (IN)

(73) Assignee: ALPHONSO INC., Mountain View, CA (US)

( * ) Notice: Subject to any disclaimer, the term of this patent is extended or adjusted under 35 U.S.C. 154(b) by 0 days.

(21) Appl. No.: 17/477,083

(22) Filed: Sep. 16, 2021

(51) Int. Cl.
G06Q 30/02 (2012.01)
(52) U.S. Cl.
CPC ..... G06Q 30/0243 (2013.01); G06Q 30/0276 (2013.01)
(58) Field of Classification Search
CPC ........................ G06Q 30/0243; G06Q 30/0276
See application file for complete search history.

(56) References Cited

U.S. PATENT DOCUMENTS

| | | | |
|---|---|---|---|
| 8,613,013 B2 | 12/2013 | Connery et al. | |
| 2003/0121046 A1* | 6/2003 | Roy | H04N 21/439 725/90 |
| 2011/0078027 A1* | 3/2011 | Li | G06Q 30/0243 705/14.69 |
| 2012/0263433 A1* | 10/2012 | Mei | G06Q 30/0276 386/E5.003 |
| 2014/0133695 A1* | 5/2014 | Lienhart | G06Q 30/0241 382/100 |

* cited by examiner

Primary Examiner — Azam A Ansari
(74) Attorney, Agent, or Firm — Panitch Schwarze Belisario & Nadel LLP (57) ABSTRACT

Automated methods are provided for identifying when a first advertisement (ad) is a likely variant of a second ad. The first and second ads each include a plurality of sequential segments of a predefined time length, wherein the second ad is a reference ad, and the first ad is a sample ad. In one embodiment, a vector of segment hits is created for the second ad, wherein the second ad is used as both the sample ad and the reference ad for creating the vector of segment hits for the second ad. A vector of segment hits is also created for the first ad, wherein the first ad is used as the sample ad and the second ad is used as the reference ad for creating the vector of segment hits for the first ad. The vector of segment hits for the first ad is compared with the vector of segment hits for the second ad, and the first ad is identified as being a likely variant of the second ad when the vector of segment hits for the first ad matches at least a predetermined percentage of the segments of the second ad, and the vector of segment hits for the first ad is not the same as the vector of segment hits of the second ad. Other embodiments create different vectors of segment hits for the first and second ads which are likewise compared to one another to determine when ad variants are present.

5 Claims, 9 Drawing Sheets
(5 of 9 Drawing Sheet(s) Filed in Color)

| a1 | a2 | a3 | a4 | a5 | a6 | a7 | a8 | a9 | a10 | a11 | a12 | a13 | a14 | a15 |
|----|----|----|----|----|----|----|----|----|-----|-----|-----|-----|-----|-----|

A

| a1 | a2 | a3 | a4 | a5 | a6 | a7 | a8 | a9 | a10 | a11 | a12 | a13 | a14 | a15 |

Example 1

| a1 | a2 | a3 | a4 | a5 | a6 | a7 | a8 | a9 | a10 | a11 | a12 | a13 | a14 | a15 |

A

| b1 = a11 | b2 = a12 | b3 = a13 | b4 = a14 | b5 = a15 | b6 = a1 | b7 = a2 | b8 = a3 | b9 = a4 | b10 = a5 | b11 = a6 | b12 = a7 | b13 = a8 | b14 = a9 | b15 = a10 |

Example 2

Example 3

Figure 4

Example 4

Figure 5

Vector of Segment Hits V(Sample|Ref)

| r1 | r2 | r3 | r4 | r5 | r6 | r7 | r8 | r9 | r10 |

Reference R

| s1 | s2 | s3 | s4 | s5 | s6 | s7 | s8 | s9 | s10 |

Sample S

START

↓

161 – Create a vector of segment hits for the second ad, wherein the second ad is used as both the sample ad and the reference ad for creating the vector of segment hits for the second ad

↓

162 – Create a vector of segment hits for the first ad, wherein the first ad is used as the sample ad and the second ad is used as the reference ad for creating the vector of segment hits for the first ad

↓

163 – Compare the vector of segment hits for the first ad with the vector of segment hits for the second ad

↓

164 – Identify that the first ad is a likely variant of the second ad when the vector of segment hits for the first ad matches at least a predetermined percentage of the segments of the second ad, and the vector of segment hits for the first ad is not the same as the vector of segment hits of the second ad

↓

END

START

↓

171 – Create a vector of segment hits for the second ad, wherein the second ad is used as both the sample ad and the reference ad for creating the vector of segment hits for the second ad

↓

172 – Create a vector of segment hits for each of the variants of the second ad, wherein the respective variants of the second ad are used as both the sample ad and the reference ad for creating the vector of segment hits for each of the variants of the second ad

↓

173 – Create a vector of segment hits for the first ad, wherein the first ad is used as the sample ad and the second ad is used as the reference ad for creating the vector of segment hits for the first ad

↓

174 – Create additional vectors of segment hits for the first ad using each of the variants of the second ad, wherein the first ad is used as the sample ad and the respective variants of the second ad are used as the reference ad for creating the additional vectors of segment hits for the first ad

↓

175 – Compare each of the vector of segment hits for the first ad with the vector of segment hits for the second ad and the vector of segment hits for each of the variants of the second ad

↓

176 – Identify that the first ad is the same ad as either the second ad or a specific one of the variants of the second ad when a particular vector of segment hits for the first ad matches the vector of segment hits for the second ad or one of the vectors of segment hits for each of the variants of the second ad, the ad associated with the matching vector of segment hits being the identified second ad or variant of the second ad

↓

END

START

↓

181 – Create a vector of segment hits for the second ad, wherein the second ad is used as both the sample ad and the reference ad for creating the vector of segment hits for the second ad

↓

182 – Create a vector of segment hits for each of the variants of the second ad, wherein the second ad is used as the reference ad, and the respective variants of the second ad are used as the sample ad for creating the vector of segment hits for each of the variants of the second ad

↓

183 – Create a vector of segment hits for the first ad, wherein the first ad is used as the sample ad and the second ad is used as the reference ad for creating the vector of segment hits for the first ad

↓

184 – Compare the vector of segment hits for the first ad with the vector of segment hits for the second ad and the vector of segment hits for each of the variants of the second ad

↓

185 – Identify that the first ad is the same ad as either the second ad or a specific one of the variants of the second ad when the vector of segment hits for the first ad matches a vector of segment hits for the second ad or one of the vectors of segment hits for each of the variants of the second ad

↓

END

Figure 18

METHOD FOR IDENTIFYING WHEN A NEWLY ENCOUNTERED ADVERTISEMENT IS A VARIANT OF A KNOWN ADVERTISEMENT

BACKGROUND OF THE INVENTION

A business model of certain companies today require that they maintain an inventory of all currently airing or streaming commercial advertisements (ads). However, unlike program content which is published in electronic program guides, there is no publicly disseminated source of aired or streamed ads. Accordingly, the burden falls on such companies to identify and catalog the ads in an ad database so as to update the inventory of ads. Thousands of new ads are aired or streamed each day, and thus new ad candidates must be collected and analyzed every day to determine which ones to add to the database. New ads must also be classified and tagged. Part of the classification and tagging process is to associate a new ad with appropriate metadata information, such as brand name, category of advertisements, and product name.

In some instances, a brand or product may develop a series of ads for the same brand or product, wherein the ads are variants of each other. Knowing that a particular ad is a variant of another ad can serve many useful functions. For example, if a newly encountered ad is determined to be a variant of an ad that is already in the database, it may not be necessary to store the variant. Also, if a newly encountered ad is determined to be a variant of an ad that is already in the database, and storage of the variant is desired, then it may be beneficial to associate the variant with the existing ad in the database since they will share similar metadata. Likewise, it may be desirable to group all variants of an ad together in the database.

Human curators may be used to classify and tag ads, and potentially also to detect variants of a previously curated ad. However, the process of using human curators for such tasks can be extremely time-consuming and prone to errors since human judgment differs among curators. Accordingly, many automated techniques have been developed to classify and tag ads. However, these automated techniques do not adequately address the detection of variants of an ad. The present invention provides an automated process for detecting variants of ads to complement existing automated techniques that classify and tag ads. The present invention also provides an automated process for using previously detected variants of ads to discover new airings of such ads.

SUMMARY OF THE PRESENT INVENTION

Automated methods are provided for identifying when a first advertisement (ad) is a likely variant of a second ad. The first and second ads each include a plurality of sequential segments of a predefined time length, wherein the second ad is a reference ad, and the first ad is a sample ad. In one embodiment, a vector of segment hits is created for the second ad, wherein the second ad is used as both the sample ad and the reference ad for creating the vector of segment hits for the second ad. A vector of segment hits is also created for the first ad, wherein the first ad is used as the sample ad and the second ad is used as the reference ad for creating the vector of segment hits for the first ad. The vector of segment hits for the first ad is compared with the vector of segment hits for the second ad, and the first ad is identified as being a likely variant of the second ad when the vector of segment hits for the first ad matches at least a predetermined percentage of the segments of the second ad, and the vector of segment hits for the first ad is not the same as the vector of segment hits of the second ad. Other embodiments create different vectors of segment hits for the first and second ads which are likewise compared to one another to determine when ad variants are present.

BRIEF DESCRIPTION OF THE DRAWINGS

The patent or application file contains at least one drawing executed in color. Copies of this patent or patent application publication with color drawings will be provided by the Office upon request and payment of the necessary fee.

Preferred embodiments of the present invention will now be described by way of example with reference to the accompanying drawings:

FIGS. 16-18 are flowcharts for preferred embodiments of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as an "audiovisual feed," A/V" feed," "TV stream" or a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data," an "audiovisual stream," or (as noted above) an "A/V feed" since a video data stream typically includes audio. The video data stream described herein may be sampled at consecutive time intervals.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

reference ad (reference advertisement)—A "reference ad" is an ad that has been previously identified and placed in a database of ads. Such databases are commonly used in automatic content recognition (ACR) systems. The ads in the database are typically stored with associated metadata (e.g., brand, product or service, and category of ad, such as the type of product or service). The reference ad may be an audio-visual ad or (video ad), or an audio-only ad (audio ad). The reference ad is also interchangeably referred to herein as a "second ad."

sample ad (sample advertisement)—A "sample ad" is an actual ad that gets evaluated against the reference ads to determine whether it is a variant of one of the reference ads. The sample ad is also interchangeably referred to herein as a "first ad."

variant—A "variant" is a form or version of something that differs in some respect from other forms of the same thing or from a standard. In one example, a variant of a reference ad is an ad that differs in some respects from the reference ad, but may be directed to the same brand, or same product, or same service. However, broadly speaking, a variant of a reference ad is an ad that contains some amount of overlap in audio or video, but which is not the same as the reference ad (i.e., not a duplicate). The amount of overlap may be a quantifiable amount, such as at least 10% overlap, as discussed below.

automatic content recognition (ACR)—(also referred to as "automated content recognition) ACR refers to identification technology to recognize content played on a media device or present in a media file. ACR systems are used in many applications to identify media content in an A/V feed.

ACR database—An ACR database is a database that is associated with an ACR system. The ACR database (also, referred to as a "reference database") maintains media content, or representations thereof (e.g., reference fingerprints), which are used to match against samples of media content to determine whether the media content in the ACR database matches, or is similar to, the sample.

II. Detailed Disclosure

Figure 1:
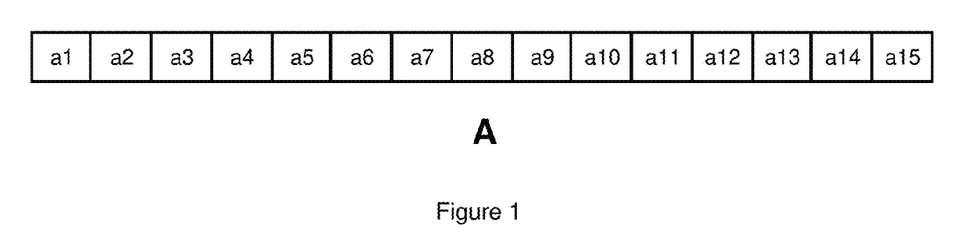
FIG. 1 shows segments of an ad.

Referring to FIG. 1, consider a scenario wherein ad A is 15 seconds long and a1, a2, a3, . . . , a15 are segments of the ad A.

Figure 2:
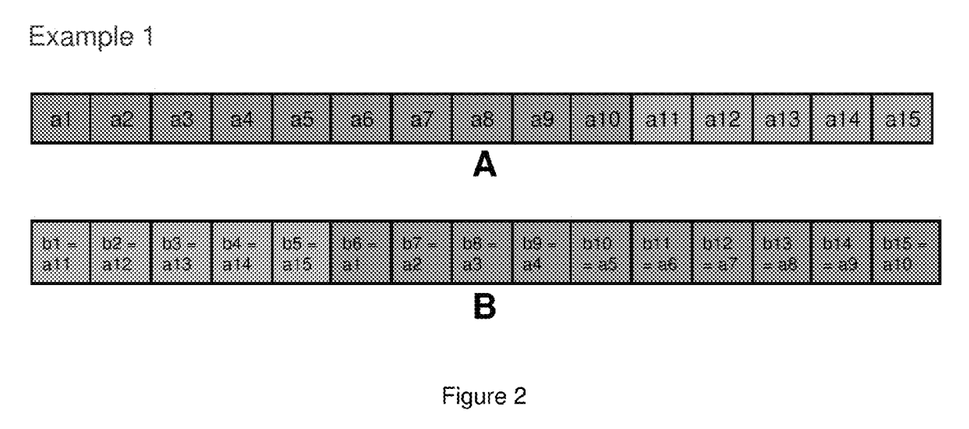
FIGS. 2-5 show some possible variants of the ad of FIG. 1.

FIGS. 2-5 show some possible variants of the ad A, as follows:

FIG. 2 (Example 1): Ad B is a 15 second ad variant of A containing all the segments of A but in a different order. More specifically, the last 5 segments of the ad A are the first 5 segments of ad B and the first 10 segments of ad A are the last 10 segments of ad B.

Figure 3:
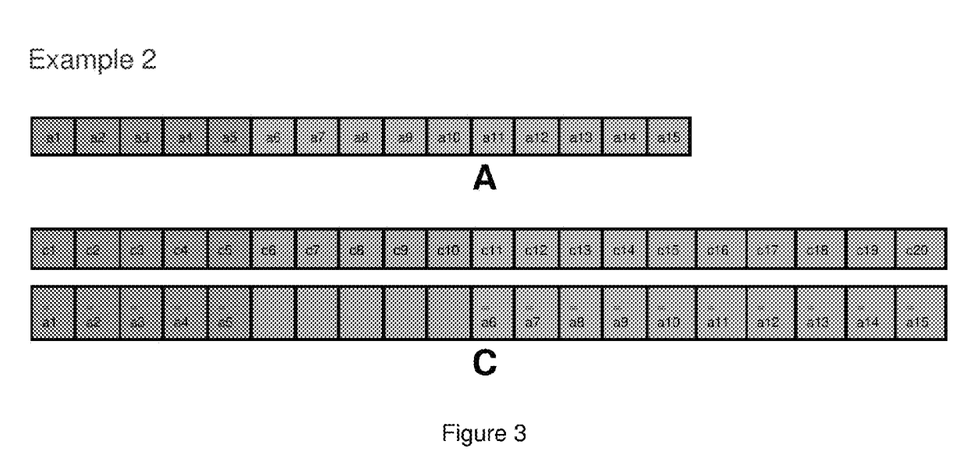

FIG. 3 (Example 2): Ad C is a 20 second ad variant of A. The first 5 segments and last 10 segments of ad C are the same as the first 5 segments and last 10 segments of A, but ad C has unique segments c6, c7, . . . , c10 in between the first 5 segments and last 10 segments of A.

Figure 4:
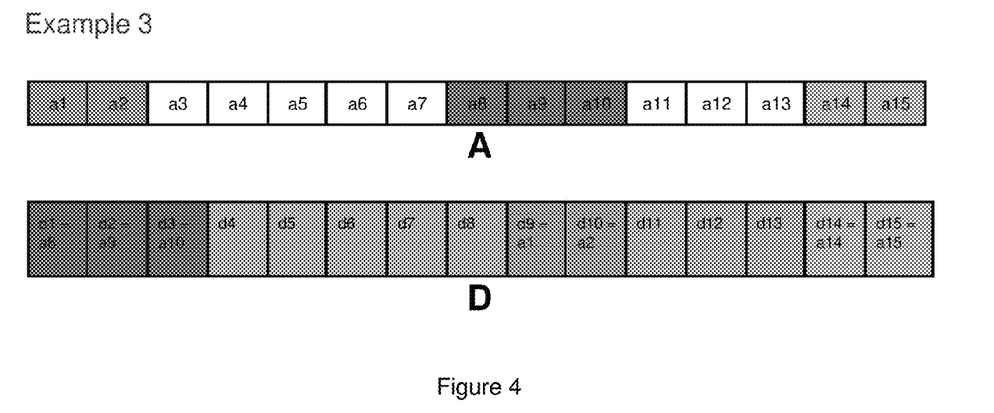

FIG. 4 (Example 3): Ad D is another 15 second ad variant of A containing some common audio/video segments. Segments a8, a9, and a11) are the same as the first 3 segments of ad D—d1, d2 and d3 respectively. Other common segments and their position is also shown in the above illustration.

Figure 5:
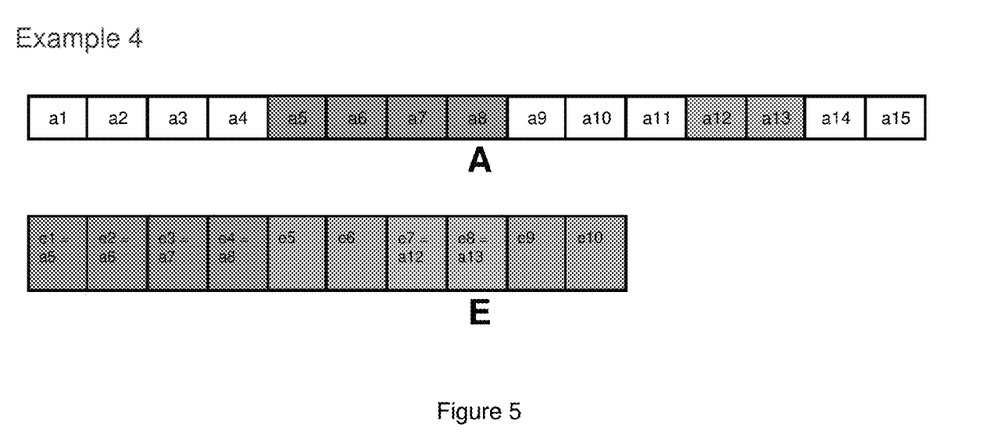

FIG. 5 (Example 4): Ad E is a 10 second variant of ad A containing some common audio/video segments. Segments e1, e2, e3, e4, e7 and e8 of ad E are the same as segments a5, a6, a7, a8, a12 and a13 of ad A respectively. e5, e6, e9 and e11) are unique segments of the ad E.

Figure 6:
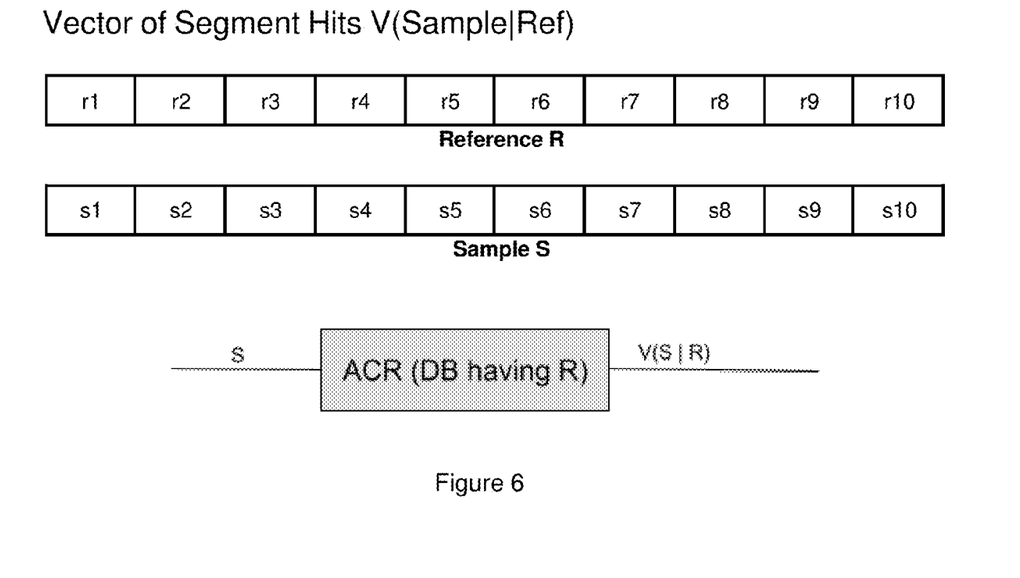
FIGS. 6 and 7 each show a vector of segment hits in accordance with preferred embodiments of the present invention.
Figure 7:
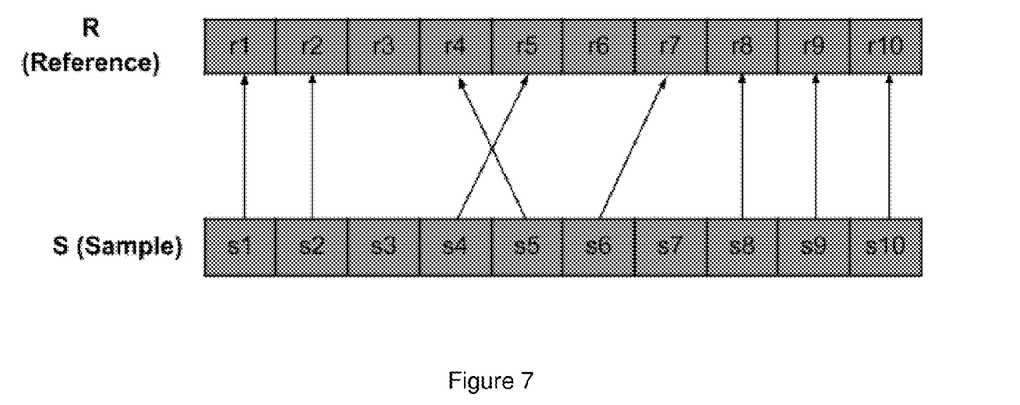

FIGS. 6 and 7 illustrate the feature of a "vector of segment hits" that is used in preferred embodiments of the present invention. Referring to FIG. 6, consider that a reference ad R is added to the ACR DB. There is also a sample ad S which is being probed. Referring again to FIG. 6, V(S|R) is a vector of length n, where n=number of segments in the sample to be probed. The $i_{th}$ element of vector V(S|R) represents the segment in reference R with which the $i_{th}$ segment of sample ($s_i$) matches (if any). If $i_{th}$ segment of the sample does not match any segment of the reference, then the $i_{th}$ element of the vector is X (unmatched). FIG. 6 also shows the sample ad S being input into an ACR system that includes a database (DB) having reference ad R. The output of the process is the vector of segment hits V(S|R).

FIG. 7 shows an example of the process described with respect to FIG. 6. If the segment of a given sample matches the segment of reference as per the diagram of FIG. 7, then the vector of segment hits V(S|R) is [r1, r2, X, r5, r4, r7, X, r8, r9, r10].

Figure 10:
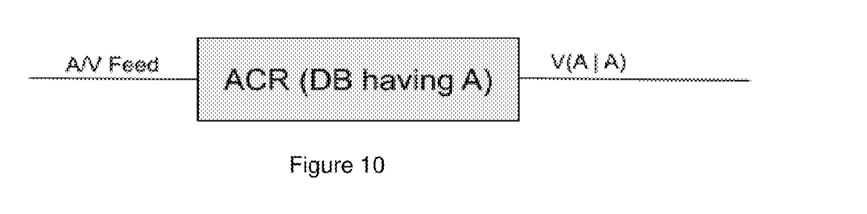
Figure 11:
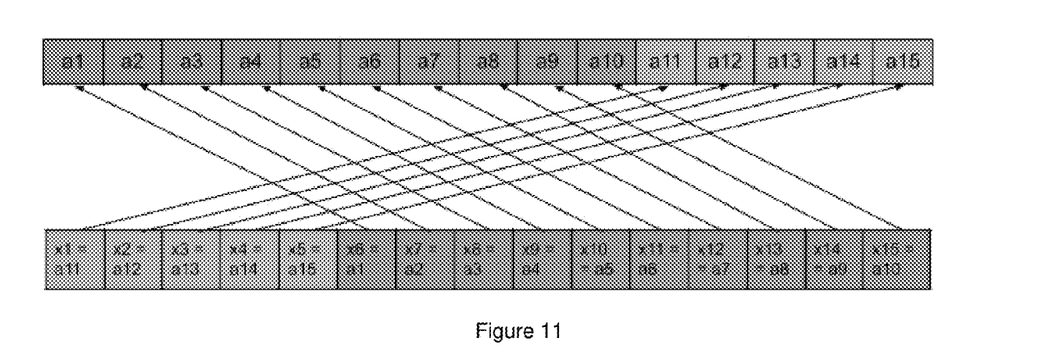
Figure 12:
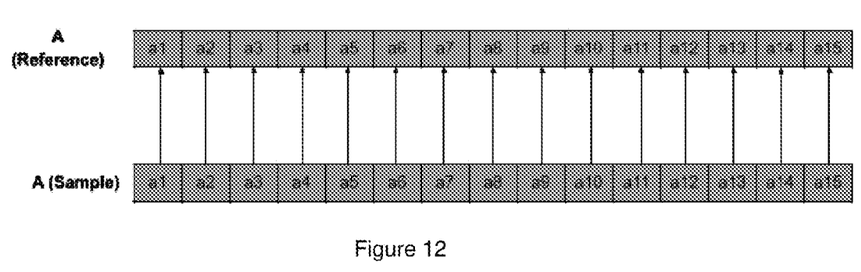
FIG. 12 shows a second use case for employing vectors of segment hits.
Figure 13:
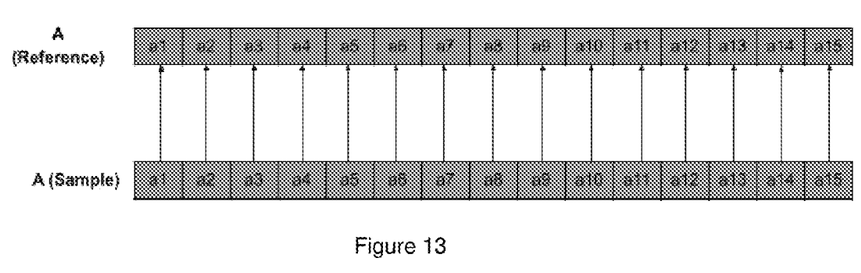
FIGS. 13 and 14 show a third use case for employing vectors of segment hits.
Figure 14:
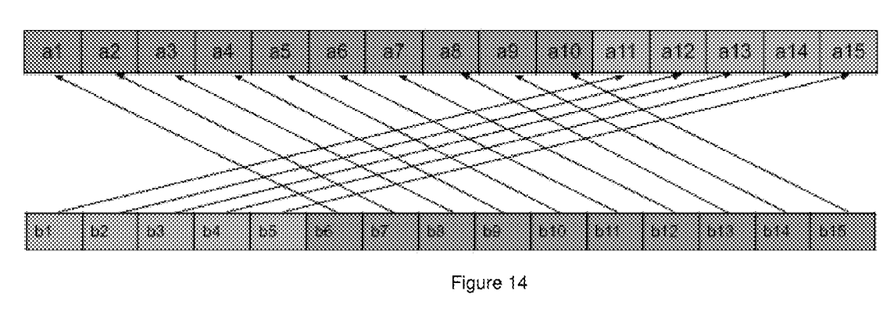

The remaining figures illustrate specific use cases for employing vectors of segment hits. FIGS. 8-11 shows a first use case. FIG. 12 shows a second use case. FIGS. 13 and 14 shows a third use case.

In the first use case, ad A is known and has been previously clipped and stored in the ACR DB, and it is desired to discover and clip variants of ad A. "Clipping" refers to the general concept of separating out the ad variant from the A/V feed so that it can be processed accordingly, which may involve storing the variant, or a representation thereof, in the ACR DB, or simply recording its presence in the A/V feed. Clip. That is, a video data stream may be "clipped" between a start time and a stop time so as to capture one or more segments of interest, here, one or more ad variants.

The first use case includes the following steps:

Step 1: Add ad A as a reference ad to the ACR DB.

Figure 8:
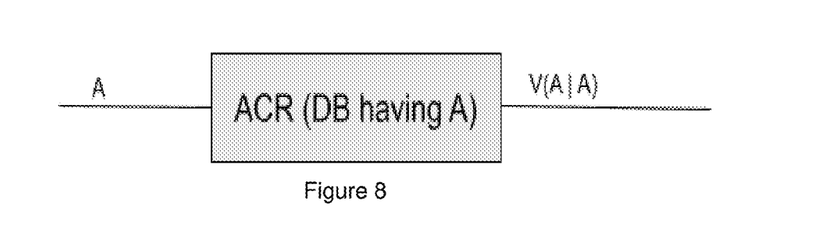
FIGS. 8-11 shows a first use case for employing vectors of segment hits.
Figure 9:
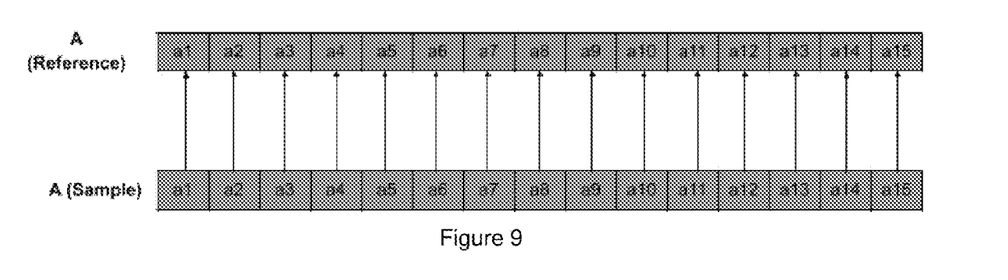

Step 2. Using the same ad A as the sample, create and save a vector of segment hits V(A|A), as shown in FIG. 8. In FIG. 8, ad A is used as the sample and ad A is also present as the reference. Assuming that the segments match as shown in FIG. 9, the vector of segment hits will be as follows:

$$V(A|A)=[a1,a2,a3,a4,a5,a6,a7,a8,a9,a10,a11,a12,a13,a14,a15]$$

Step 3: An A/V feed is then plugged into the ACR system, as shown in FIG. 10.

Step 4: Now, when a variant X is played, generate V(X|A). For example, assume that X (a variant of A) is airing and gets probed by the ACR system, and it matches A as per the diagram in FIG. 11. V(X|A) is generated as follows:

$$V(X|A)=[a11,a12,a13,a14,a15,a1,a2,a3,a4,a5,a6,a7,a8,a9,a10]$$

Step 4: Compare V(X|A) with V(A|A) to identify whether X is A, whether X is a variant of A, or whether X is not A or any variant of A.

Result a: If V(X|A) is the same as V(A|A), then conclude that the ad which is airing is A. Accordingly, the ad is thus inherently not a variant of A.

Result b: If V(X|A) matches some or all segments of A but is not same as V(A|A), then conclude that a variant of A is airing and the ad is clipped.

Result c: If V(X|A) does not match any segment of A or matches very few segments of A (e.g., less than 10% of the segments), then conclude that X is not A, nor is X a variant of A.

In this example, Result b is met because V(X|A) matches all segments of A but is not same as V(A|A) due to the different order of the segments.

In the second use case, ad A and all of its variants B, C, and D are known and have been previously clipped and stored in the ACR DB, and it is desired to discover all of the airings or streamings of ad A and its variants. Stated another way, it is desired to discover if a currently aired or streamed ad is (i.e., matches) ad A or any of its variants.

The second use case includes the following steps:
Step 1: Add ads A, B, C, and D as reference ads to the ACR DB.
Step 2: Calculate and store V(A|A), V(B|B), V(C|C), V(D|D).
Step 3: An A/V feed is then plugged into the ACR system (not shown).
Step 4: When an airing of an ad X (which can be either A, B, C or D) starts, the ACR system generates V(X|A), V(X|B), V(X|C) and V(X|D).
Step 5: Compare V(X|A) with V(A|A), V(X|B) with V(B|B) and so on.
Step 6: If V(X|A) matches with V(A|A), then the airing or streaming is of ad A. Similarly, if V(X|B) matches V(B|B) then the airing or streaming is of content B, and so on.

Example of second use case: Consider ads A, B, C, and D as described in Example 1 (FIG. 2), Example 2 (FIG. 3), and Example 3 (FIG. 4) above. After adding ads to the ACR DB, calculate V(A|A), V(B|B), and so on.

Consider a scenario where for ad A, matches occur as shown in FIG. 12, wherein the same ad is used for the sample and the reference (same as FIG. 9). Therefore, $$V(A|A)=[a1,a2,a3,a4,a5,a6,a7,a8,a9,a10,a11,a12, a13,a14,a15]$$

Similarly, $V(B|B)=[b1,b2,b3,b4,b5,b6,b7,b8,b9,b10, b11,b12,b13,b14,b15]$ $$V(C|C)=[c1,c2,c3,c4,c5,c6,c7,c8,c9,c10,c11,c12,c13, c14,c15,c16,c17,c18,c19,c20]$$

$$V(D|D)=[d1,d2,d3,d4,d5,d6,d7,d8,d9,d10,d11,d12, d13,d14,d15]$$

Now after plugging in the audio/video feeds, when an airing of ad X starts, the ACR system matches it against all of A, B, C and D. Assume that this process generates the following vector of segment hits:

$$V(X|A)=[a11,a12,a13,a14,a15,a1,a2,a3,a4,a5,a6,a7, a8,a9,a10]$$

$$V(X|B)=[b1,b2,b3,b4,b5,b6,b7,b8,b9,b10,b11,b12, b13,b14,b15]$$

$$V(X|C)=[c16,c17,c18,c19,c20,c1,c2,c3,c4,c5,c11,c12, c13,c14,c15]$$

$$V(X|D)=[X,X,X,d14,d15,d9,d10,X,X,X,X,X,d1,d2,d3]$$

Here, by comparing corresponding segment hit vectors one can say that since V(X|B) is matching V(B|B), then the airing or streaming probe (sample) is of content B.

The third use case is similar to the second use case wherein ad A and all of its variants B, C, and D are known, except that only ad A is clipped and stored in the ACR DB. Similar to the second use case, it is also desired to discover all of the airings or streamings of ad A and its variants. Stated another way, it is desired to discover if a currently aired or streamed ad is (i.e., matches) ad A or any of its variants.

The third use case includes the following steps:
Step 1: Add ad A as a reference ad to the ACR DB.
Step 2: Calculate and store V(A|A), V(B|A), V(C|A), V(D|A).
Step 3: An A/V feed is then plugged into the ACR system (not shown).
Step 4: When an airing of an ad X (which can be either A, B, C or D) starts, the ACR system generates V(X|A).
Step 5: Compare V(X|A) with V(A|A), V(B|A), V(C|A) and V(D|A).
Step 6: Determine if any of the results below exist:
a. If V(X|A) matches V(A|A) then it means that the airing is of ad A
b. If V(X|A) matches V(B|A) then it means that the airing is of ad B
c. If V(X|A) matches V(C|A) then it means that the airing is of ad C
d. If V(X|A) matches V(D|A) then it means that the airing is of ad D Example of third use case: Similar to the second use case, consider ads A, B, C, and D as described in Example 1 (FIG. 2), Example 2 (FIG. 3), and Example 3 (FIG. 4) above.

After adding ad A to the reference ACR DB, calculate V(A|A), V(B|A), V(C|A) and V(D|A). For ad A, matches occur as shown in FIG. 13. Therefore, $$V(A|A)=[a1,a2,a3,a4,a5,a6,a7,a8,a9,a10,a11,a12, a13,a14,a15]$$

For ad B, matches occur as shown in FIG. 14. Therefore, $$V(B|A)=[a11,a12,a13,a14,a15,a1,a2,a3,a4,a5,a6,a7, a8,a9,a10]$$

Similarly, for ad C:

$$V(C|A)=[a1,a2,a3,a4,a5,X,X,X,X,X,a1,a2,a3,a4,a5,a6, a7,a8,a9,a10]$$

Similarly for ad D:

$$V(D|A)=[a8,a9,a10,X,X,X,X,X,a1,a2,X,X,X,a14,a15]$$

Now after plugging in the audio/video feeds, when an airing or streaming of ad X starts, the ACR system matches it against A. Assume that it generates the following vector of segment hits:

$$V(X|A)=[a11,a12,a13,a14,a15,a1,a2,a3,a4,a5,a6,a7, a8,a9,a10]$$

Now compare V(X|A) against V(A|A), V(B|A), V(C|A) and V(D|A). Since V(X|A) is matching with V(B|A), one can conclude that the airing or streaming is of content B.

Figure 15:
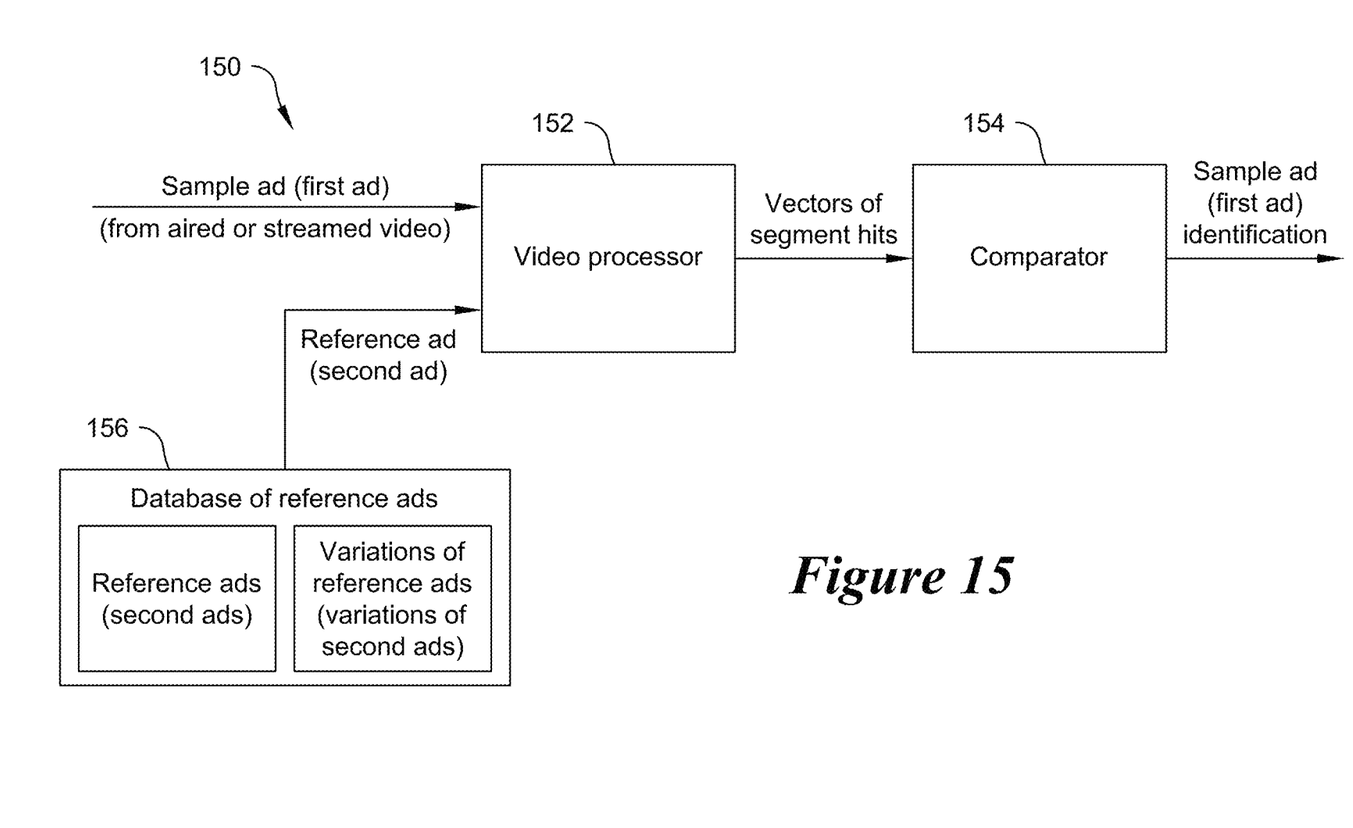
FIG. 15 is a schematic diagram for implementing preferred embodiments of the present invention.

FIG. 15 is a schematic diagram of a system 150 for implementing preferred embodiments of the present invention in accordance with the above-described first, second, and third use cases. The system 150 includes the following components having the noted functions:

video processor 152—creates the vectors of segment hits that are necessary for the respective use case.

comparator 154—compares the created vectors of segment hits in accordance with the respective use case, and outputs the appropriate identification result regarding the first ad.

database of reference ads 156—maintains the reference ads (second ads) and any variants thereof that are needed for the respective use case. Some use cases only need to use the second ad, whereas other use cases need to use the second ad and any stored variants thereof.

Figure 16:
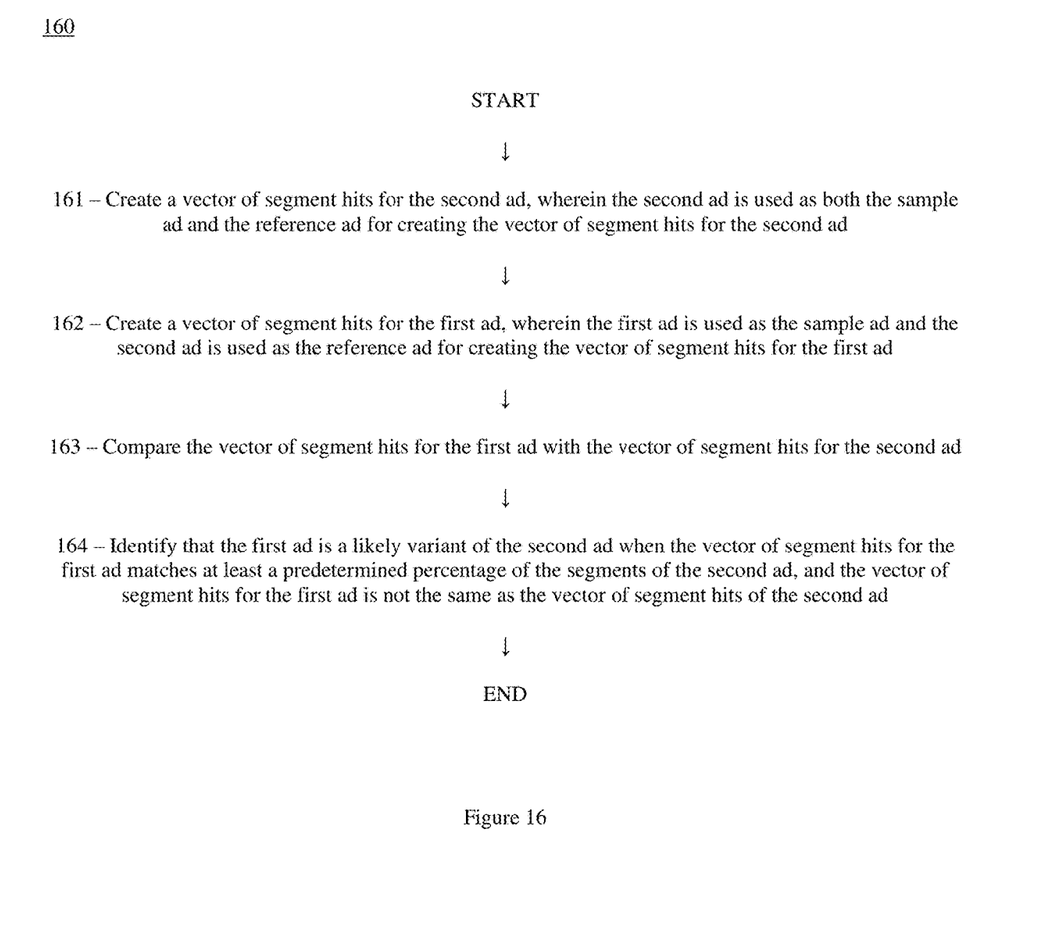

FIG. 16 is a flowchart 160 of one embodiment of the present invention which is associated with the first use case described above. More specifically, an automated method is provided for identifying when a first ad (ad X) is a likely variant of a second ad (ad A). The first and second ads each include a plurality of sequential segments of a predefined time length, wherein the second ad is a reference ad, and the first ad is a sample ad. Referring to FIGS. 15 and 16, the automated method operates as follows:

Step 161: Create, by the video processor 152, a vector of segment hits for the second ad, wherein the second ad is used as both the sample ad and the reference ad for creating the vector of segment hits for the second ad. The vector of segment hits for the second ad is V(A|A).

Step 162: Create, by the video processor 152, a vector of segment hits for the first ad, wherein the first ad is used as the sample ad and the second ad is used as the reference ad for creating the vector of segment hits for the first ad. The vector of segment hits for the first ad is V(X|A).

Step 163: Compare, by the comparator 154, the vector of segment hits for the first ad with the vector of segment hits for the second ad.

Step 164: Identify, by the comparator 154, that the first ad is a likely variant of the second ad when the vector of segment hits for the first ad (V(X|A)) matches at least a predetermined percentage of the segments of the second ad, and the vector of segment hits for the first ad (V(X|A)) is not the same as the vector of segment hits of the second ad (V(A|A)). In one example, the predetermined percentage is 10%.

In one implementation of the first use case, the vector of segment hits is created for the second ad using the second ad in the database of reference ads 156, and the first ad is currently being aired or streamed, and the segments in the vector of segment hits are compared by creating digital fingerprints of each segment, and then comparing the digital fingerprints with each other.

FIG. 17 is a flowchart 170 of another embodiment of the present invention which is associated with the second use case described above. More specifically, an automated method is provided for identifying when a first ad (ad X) is a likely match of either a second ad (ad A), or one or more variants of the second ad (e.g., ad B, ad C, or ad D). The first ad, the second ad, and the one or more variants of the second ad each include a plurality of sequential segments of a predefined time length, wherein the second ad and the one or more variants of the second ad are each reference ads, and the first ad is a sample ad. Referring to FIGS. 15 and 17, the automated method operates as follows:

Step 171: Create, by the video processor 152, a vector of segment hits for the second ad, wherein the second ad is used as both the sample ad and the reference ad for creating the vector of segment hits for the second ad. The vector of segment hits for the second ad is V(A|A).

Step 172: Create, by the video processor 152, a vector of segment hits for each of the variants of the second ad, wherein the respective variants of the second ad are used as both the sample ad and the reference ad for creating the vector of segment hits for each of the variants of the second ad. In this example, the vector of segment hits for the variants of the second ad are V(B|B), V(C|C), and V(D|D).

Step 173: Create, by the video processor 152, a vector of segment hits for the first ad, wherein the first ad is used as the sample ad and the second ad is used as the reference ad for creating the vector of segment hits for the first ad. The vector of segment hits for the first ad is V(X|A).

Step 174: Create, by the video processor 152, additional vectors of segment hits for the first ad using each of the variants of the second ad, wherein the first ad is used as the sample ad and the respective variants of the second ad are used as the reference ad for creating the additional vectors of segment hits for the first ad. In this example, the additional vectors of segment hits for the first ad are V(X|B), V(X|C), and V(X|D).

Step 175: Compare, by the comparator 154, each of the vector of segment hits for the first ad with the vector of segment hits for the second ad and the vector of segment hits for each of the variants of the second ad.

Step 176: Identify, by the comparator 154, that the first ad is the same ad as either the second ad or a specific one of the variants of the second ad when a particular vector of segment hits for the first ad (V(X|A), V(X|B), V(X|C), V(X|D)) matches the vector of segment hits for the second ad, or one of the vectors of segment hits for each of the variants of the second ad (V(A|A), V(B|B), V(C|C), V(D|D)). The ad associated with the matching vector of segment hits is the identified second ad or variant of the second ad.

Conversely, the first ad is determined as not being the same ad as either the second ad or a specific one of the variants of the second ad when none of the vectors of segment hits for the first ad (V(X|A), V(X|B), V(X|C), V(X|D)) match any of the vectors of segment hits for the second ad or one of the vectors of segment hits for each of the variants of the second ad.

In one implementation of the second use case, the vector of segment hits are created for the second ad and for the one or more variants of the second ad using the second ad and the one or more variants of the second ad in the database of reference ads 146, the first ad is currently being aired or streamed, and the segments in the vectors of segment hits are compared by creating digital fingerprints of each segment, and then comparing the digital fingerprints with each other.

Figure 18:
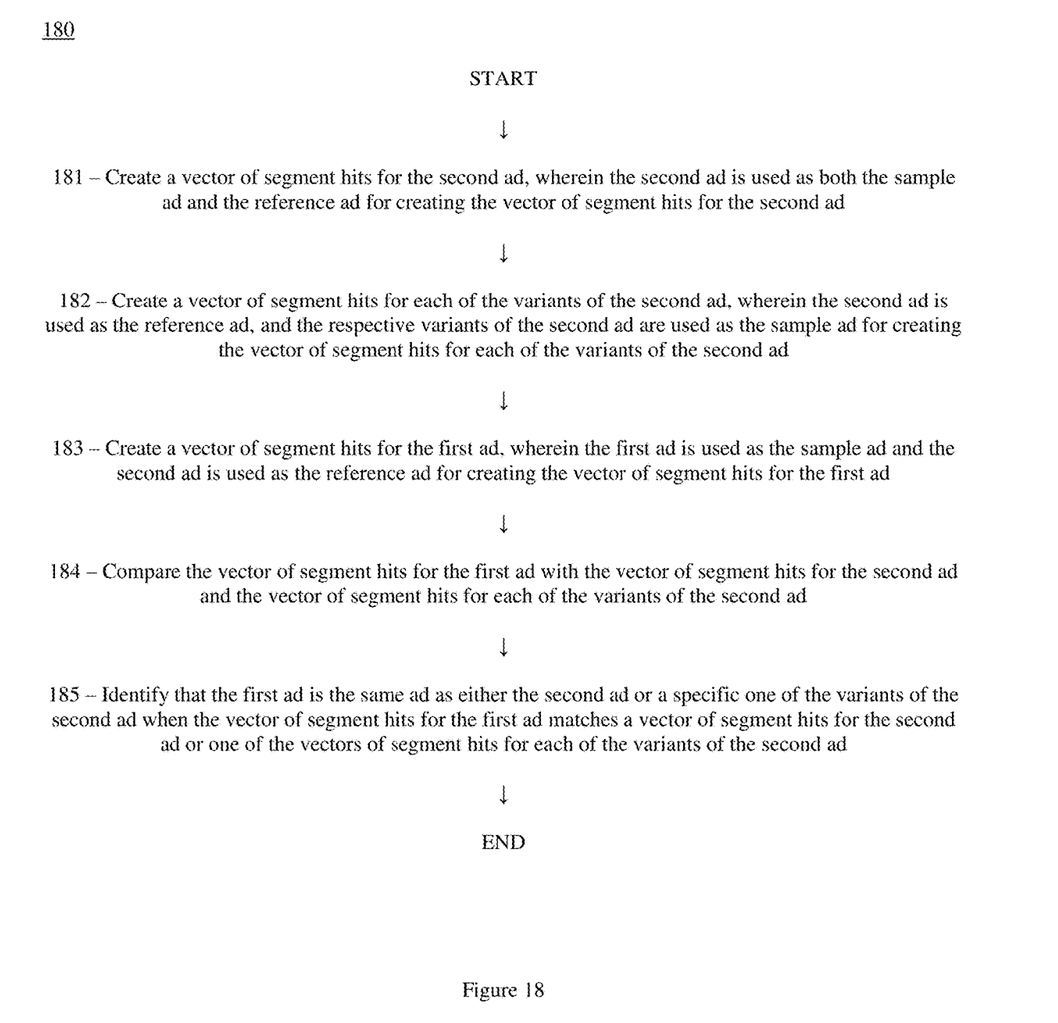

FIG. 18 is a flowchart 180 of another embodiment of the present invention which is associated with the third use case described above. More specifically, an automated method is provided for identifying when a first ad (ad X) is a likely match of either a second ad (ad A), or one or more variants of the second ad (e.g., ad B, ad C, or ad D), the first ad, the second ad, and the one or more variants of the second ad each including a plurality of sequential segments of a predefined time length, wherein the second ad and the one or more variants of the second ad are each reference ads, and the first ad is a sample ad. Referring to FIGS. 15 and 18, the automated method operates as follows:

Step 181: Create, by the video processor 152, a vector of segment hits for the second ad, wherein the second ad is used as both the sample ad and the reference ad for creating the vector of segment hits for the second ad. The vector of segment hits for the second ad is V(A|A).

Step 182: Create, by the video processor 152, a vector of segment hits for each of the variants of the second ad, wherein the second ad is used as the reference ad, and the respective variants of the second ad are used as the sample ad for creating the vector of segment hits for each of the variants of the second ad. The vector of segment hits for the variants of the second ad are V(B|A), V(C|A), and V(D|A).

Step 183: Create, by the video processor 152, a vector of segment hits for the first ad, wherein the first ad is used as the sample ad and the second ad is used as the reference ad for creating the vector of segment hits for the first ad. The vector of segment hits for the first ad is V(X|A).

Step 184: Compare, by the comparator 154, the vector of segment hits for the first ad (V(X|A)) with the vector of segment hits for the second ad and the vector of segment hits for each of the variants of the second ad (V(A|A)(B|A), V(C|A), V(D|A)).

Step 185: Identify, by the comparator 154, that the first ad is the same ad as either the second ad or a specific one of the variants of the second ad when the vector of segment hits for the first ad (V(X|A)) matches a vector of segment hits for the second ad or one of the vectors of segment hits for each of the variants of the second ad (V(A|A), V(B|A), V(C|A), V(D|A)). The ad associated with the matching vector of segment hits is the identified second ad or variant of the second ad.

In one implementation of the third use case, the vector of segment hits is created for the second ad and for the one or more variants of the second ad using the second ad in the database of reference ads, the first ad is currently being aired or streamed, and the segments in the vectors of segment hits are compared by creating digital fingerprints of each segment, and then comparing the digital fingerprints with each other.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for identifying when a first advertisement (ad) is a likely variant of a second ad, the first and second ads each including a plurality of sequential segments of a predefined time length, wherein the second ad is a reference ad, and the first ad is a sample ad, wherein the first ad is a likely variant of the second ad when (i) the second ad contains at least some amount of overlap in audio or video with the first ad, and (ii) the second ad does not contain exactly the same audio and video as the first ad, the method comprising:
   (a) creating, by a video processor, a vector of segment hits for the second ad, wherein the second ad is used as both the sample ad and the reference ad for creating the vector of segment hits for the second ad;
   (b) creating, by the video processor, a vector of segment hits for the first ad, wherein the first ad is used as the sample ad and the second ad is used as the reference ad for creating the vector of segment hits for the first ad;
   (c) comparing, by a comparator, the vector of segment hits for the first ad with the vector of segment hits for the second ad; and
   (d) identifying, by the comparator, that the first ad is a likely variant of the second ad when the vector of segment hits for the first ad matches at least a predetermined percentage of the segments of the second ad, and the vector of segment hits for the first ad is not the same as the vector of segment hits of the second ad, and wherein the vector of segment hits for the first ad and the second ad identifies matching segments regardless of their location in the plurality of sequential segments.

2. The method of claim 1 wherein a database of reference ads is maintained, and the reference ads include the second ad, and wherein the vector of segment hits are created for the second ad using the second ad in the database of reference ads.

3. The method of claim 2 wherein the first ad is currently being aired or streamed.

4. The method of claim 1 wherein the segments in the vector of segment hits are compared by creating digital fingerprints of each segment, and then comparing the digital fingerprints with each other.

5. The method of claim 1 wherein the predetermined percentage is 10%.

\* \* \* \* \*